United States Patent
Han et al.

(10) Patent No.: US 9,508,996 B2
(45) Date of Patent: Nov. 29, 2016

(54) CONNECTING MATERIAL FOR A TUBULAR SOLID OXIDE FUEL CELL, AND TUBULAR SOLID OXIDE FUEL CELL STACK INCLUDING SAME

(75) Inventors: Ki Moon Han, Anseong-si (KR); Song Ho Choi, Anseong-si (KR); Chong Sik Lim, Suwon-si (KR)

(73) Assignee: MICO CO., LTD., Anseong-Si, Gyeonggi-Do (KR)

( * ) Notice: Subject to any disclaimer, the term of this patent is extended or adjusted under 35 U.S.C. 154(b) by 384 days.

(21) Appl. No.: 14/110,726

(22) PCT Filed: Apr. 3, 2012

(86) PCT No.: PCT/KR2012/002487
§ 371 (c)(1),
(2), (4) Date: Oct. 9, 2013

(87) PCT Pub. No.: WO2012/148093
PCT Pub. Date: Nov. 1, 2012

(65) Prior Publication Data
US 2014/0038082 A1    Feb. 6, 2014

(30) Foreign Application Priority Data
Apr. 25, 2011    (KR) .................. 10-2011-0038469

(51) Int. Cl.
| | | |
|---|---|---|
| *H01M 8/04* | (2016.01) | |
| *H01M 8/10* | (2016.01) | |
| *H01M 8/12* | (2016.01) | |
| *H01M 8/02* | (2016.01) | |
| *H01M 8/24* | (2016.01) | |

(52) U.S. Cl.
CPC ............ *H01M 8/0297* (2013.01); *H01M 8/12* (2013.01); *H01M 8/243* (2013.01); *H01M 2008/1293* (2013.01); *Y02E 60/521* (2013.01); *Y02E 60/525* (2013.01)

(58) Field of Classification Search
CPC .... H01M 8/0297; H01M 8/12; H01M 8/243; H01M 8/02; H01M 8/24; H01M 2008/1293
See application file for complete search history.

(56) References Cited

U.S. PATENT DOCUMENTS

| | | | |
|---|---|---|---|
| 2005/0095483 A1* | 5/2005 | Song ................ | C04B 35/016 429/466 |
| 2008/0118812 A1* | 5/2008 | Kawakami et al. | ............ 429/38 |
| 2008/0233463 A1* | 9/2008 | Sarro ..................... | 429/35 |

FOREIGN PATENT DOCUMENTS

| | | |
|---|---|---|
| JP | 2005-216652 | 8/2005 |
| JP | 2008-53016 | 3/2008 |
| JP | 2008-84551 | 4/2008 |
| JP | 2008-159448 | 7/2008 |
| JP | 2009-245660 | 10/2009 |

OTHER PUBLICATIONS

International Search Report for International Application No. PCT/KR2012/002487 dated Oct. 18, 2012.

* cited by examiner

*Primary Examiner* — Kenneth Douyette
(74) *Attorney, Agent, or Firm* — Kile Park Reed & Houtteman PLLC

(57) ABSTRACT

Disclosed is a connector for a solid oxide fuel cell, which electrically connects tubular solid oxide fuel cells to each other. The connector includes a conductive body part having a first electrode contact groove and a second electrode contact groove. A first electrode contact part is formed on the top surface of the body part to receive at least a portion of an exposed first electrode portion and second electrode portion of a first solid oxide fuel cell, and is electrically connected to the first electrode of the first solid oxide fuel cell. A second electrode contact part is formed at the bottom surface of the body part so as to receive at least a portion of exposed first electrode portion and second electrode portion of a second solid oxide fuel cell, and is electrically connected to the second electrode of the second solid oxide fuel cell.

11 Claims, 6 Drawing Sheets

CONNECTING MATERIAL FOR A TUBULAR SOLID OXIDE FUEL CELL, AND TUBULAR SOLID OXIDE FUEL CELL STACK INCLUDING SAME

TECHNICAL FIELD

The present invention relates a connector for a tubular solid oxide fuel cell and a tubular solid oxide fuel cell stack including the same. More particularly, the present invention relates to a connector for a tubular solid oxide fuel cell that electrically connects a plurality of tubular solid oxide fuel cells to each other and a tubular solid oxide fuel cell stack including the same.

BACKGROUND ART

Although solid oxide fuel cells, so-called, the third generation fuel cells, were studied later than phosphoric acid fuel cells (PAFCs) and molten carbonate fuel cells (MCFCs), the solid oxide fuel cells are expected to be in practical use in the near future, subsequent to the PAFCs and the MCFCs, by virtue of the recent rapid development of material technologies. To commercialize the solid oxide fuel cells, advanced nations have devoted tremendous effort to the fundamental research on SOFC and enlarged production scale.

Such a solid oxide fuel cell is operated at a high temperature ranging from about 600° C. to about 1,000° C., and has advantages in that it is the most highly efficient of existing fuel cells, there are few pollutants discharged, a fuel reformer is not necessary, and a combined power generation is feasible.

The solid oxide fuel cell may be largely classified into a tubular solid oxide fuel cell and a planar solid oxide fuel cell. According to the planar solid oxide fuel cell, a planar solid oxide fuel cell stack has a power density greater than that of a tubular solid oxide fuel cell stack. However, it is difficult to manufacture a large-area fuel cell due to a gas sealing problem, a thermal shock generated by a thermal equilibrium coefficient difference between materials, and the like. In recent years, studies with respect to the tubular solid oxide fuel cell are being actively carried out. The tubular solid oxide fuel cell may be classified into an air electrode-supported type and a fuel electrode-supported type. However, in the case of the air electrode-supported type, the air electrode-supported type suffers from a disadvantage of a relatively high manufacturing cost because air electrode materials, such as lanthanum (La), manganese (Mn), etc., are very expensive, and LaSrMnO$_3$ (LSM) that is a raw material for the air electrode is difficult in manufacturing. In addition, the unit cell has a low mechanical strength and does not withstand impact because the air electrode serving as the support is made of ceramic. To solve the above-described problems, a fuel electrode-supported solid oxide fuel cell using a fuel electrode as the support has been developed.

The tubular fuel electrode support used in the fuel electrode-supported solid oxide fuel cell satisfies demands required as both the electrode and the support, and is advantageous in that co-sintering is feasible because reactivity between the support and an electrolyte layer is low, and a stable fuel cell stack is fabricated due to a high mechanical strength of the support. To generating high power by using the tubular solid oxide fuel cell, a stack of the tubular solid oxide fuel cell has to be provided. Also, to manufacture the stack of the tubular solid oxide fuel cell, it is necessary to develop a connector for electrically connecting unit cells to each other.

DISCLOSURE OF THE INVENTION

Technical Problem

An object of the present invention provides a connector for a tubular solid oxide fuel cell, which electrically connects tubular solid oxide fuel cells to each other.

Another object of the present invention provides a stack of a tubular solid oxide fuel cell including the connector.

Technical Solution

According to an aspect of the present invention, a connector for a solid oxide fuel cell, the connector including a conductive body part for electrically connecting solid oxide fuel cells to each other, each including a first electrode having an inner passage and an electrolyte and second electrode successively stacked on the first electrode to expose both ends of the first electrode. The conductive body part includes a first electrode contact groove and a second electrode contact groove. The first electrode contact groove accommodates at least one portions of the exposed portion of the first electrode and a second electrode of the first solid oxide fuel cell in a top surface thereof and is electrically connected to the first electrode of the first solid oxide fuel cell. The second electrode contact groove accommodates at least one portions of the exposed portion of the first electrode and the second electrode in a bottom surface thereof and is electrically connected to the second electrode of the second solid oxide fuel cell.

In the embodiments of the present invention, the first electrode contact grooves may include an electrode contact part and an electrode accommodation part. The electrode contact part may have a semicircular cross-section with a first diameter to accommodate the exposed first electrode of the first solid oxide fuel cell. The electrode accommodation part may have a semicircular cross-section with a second diameter greater than the first diameter to accommodate the second electrode of the first solid oxide fuel cell. An insulating layer may be disposed on the electrode accommodation part. The second electrode contact groove may have the semicircular cross-section with a third diameter equal to the second diameter or less than the second diameter.

In the embodiments of the present invention, the body part may further include a first through hole and a second through hole. The first through hole may penetrate through the body part and be connected to a first end of the first electrode contact groove and a first end of the second electrode contact groove which are adjacent to each other. The first through hole may penetrate through the body part and be connected to a second end of the first electrode contact groove and a second end of the second electrode contact groove which are adjacent to each other. Also, the body part may further include a third through hole penetrating through the body part in a portion at which at least one portion of the second electrodes of the first and second solid oxide fuel cells is disposed.

In the embodiments of the present invention, the body part may further include an electrode contact bar connecting both facing ends of the third through hole to each other and electrically connected to the second electrode of the second tubular solid oxide fuel cell.

According to another aspect of the present invention, a solid oxide fuel cell stack includes first and second solid oxide fuel cells and an intermediate connector. Each of the first and second solid oxide fuel cells includes a first electrode having an inner passage and an electrolyte and second electrode successively stacked on the first electrode to expose both ends of the first electrode. The intermediate connector includes a first body part having a first electrode contact groove for accommodating the first solid oxide fuel cell in a top surface thereof and a second electrode contact groove for accommodating the second solid oxide fuel cell in a bottom surface thereof. The first electrode contact groove accommodates at least one portions of the exposed portion of the first electrode and a second electrode of the first solid oxide fuel cell and is electrically connected to the exposed portion of the first electrode of the first solid oxide fuel cell. The second electrode contact groove accommodates at least one portions of the exposed portion of the first electrode and the second electrode of the second solid oxide fuel cell and is electrically connected to the second electrode of the second solid oxide fuel cell.

In the embodiments of the present invention, the solid oxide fuel cell stack may further include an upper connector and a lower connector. The upper connector may include a second body part having a third electrode contact groove accommodating the first solid oxide fuel cell together with the first electrode contact groove and electrically connected to the second electrode of the first solid oxide fuel cell. The lower connector may include a third body part having a fourth electrode contact groove accommodating the second solid oxide fuel cell together with the second electrode contact groove and electrically connected to the first electrode of the second solid oxide fuel cell.

In the embodiments of the present invention, the first body part may include a first through hole connected to an inner passage of each of the first and second solid oxide fuel cells, the second body part may include a first gas groove connected to the first through hole, and the third body part may include a second gas groove connected to the first through hole and a first gas injection hole for injecting a first gas into the second gas groove. Also, the first body part may include a second through hole formed in a position at which the second electrode of each of the first and second solid oxide fuel cells is disposed, the second body part may include a third gas groove connected to the second through hole, and the third body part may include a fourth gas groove connected to the second through hole and a second gas injection hole for injecting a second gas into the fourth gas groove.

In the embodiments of the present invention, the solid oxide fuel cell stack may further include: a first insulating member disposed between the intermediate connector and the upper connector to insulate the intermediate from the upper connector; and a second insulating member disposed between the intermediate connector and the lower connector to insulate the intermediate from the lower connector.

Advantageous Effects

As described above, according to the embodiments of the present invention, the tubular solid oxide fuel cell may be accommodated in the electrode contact groove formed in the connector to form the stable solid oxide fuel cell stack. Also, since the passages through which hydrogen H2 and air flow are formed in the connector, the solid oxide fuel cell stack that is easily sealed may be manufactured. Also, when the solid oxide fuel cell stack is manufactured by using the connectors according to the embodiments of the present invention, an additional constitution for collecting electricity may be unnecessary, and the stack assembling process may be simplified.

MODE FOR CARRYING OUT THE INVENTION

Figure 1:
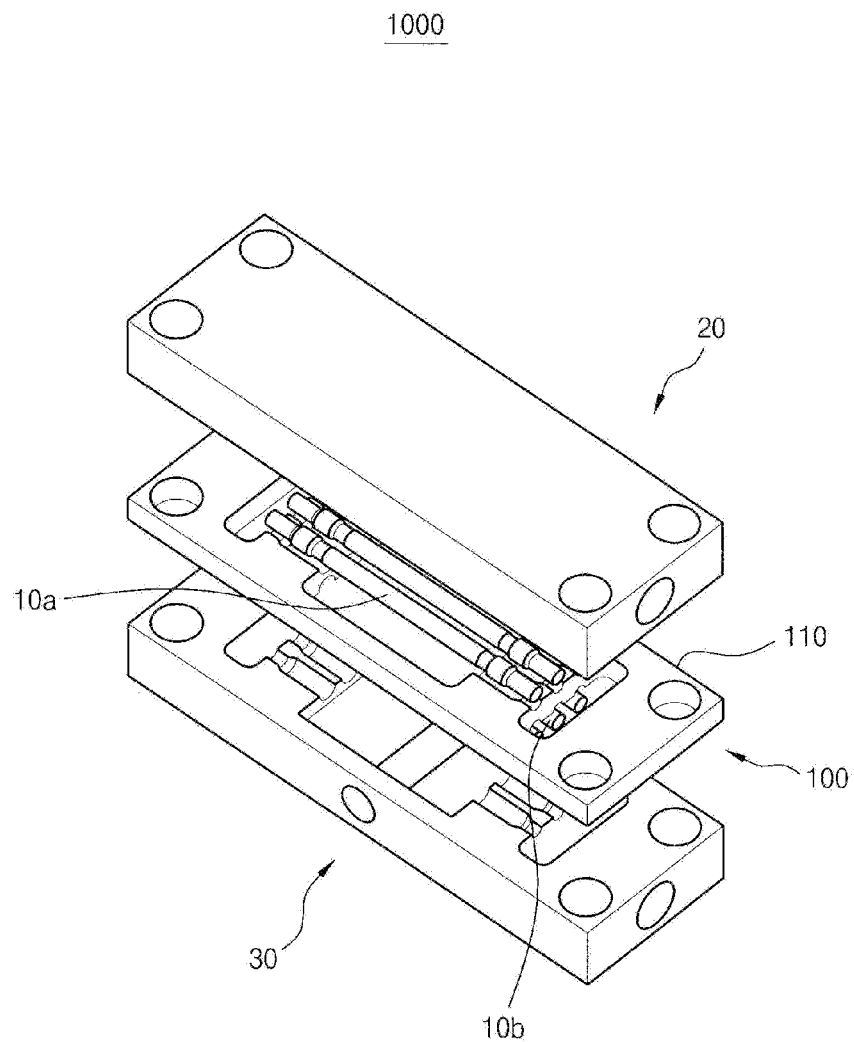
FIG. 1 is a perspective view of a solid oxide fuel cell stack according to a first embodiment of the present invention.

Hereinafter, a connector for a tubular solid oxide fuel cell and a tubular solid oxide fuel cell stack including the same according to embodiments of the present invention will be described in detail with reference to the accompanying drawings. Since the present invention may have diverse modified embodiments, preferred embodiments are illustrated in the drawings and are described in the detailed description of the invention. However, this does not limit the present invention within specific embodiments and it should be understood that the present invention covers all the modifications, equivalents, and replacements within the idea and technical scope of the present invention. In description of the drawings, like reference numerals in the drawings denote like elements. In the drawings, dimensions of structures are enlarged or exaggerated for clarity.

It will be understood that although the terms of first and second are used herein to describe various elements, these elements should not be limited by these terms. Terms are only used to distinguish one component from other components. For example, a component referred to as a first component in one embodiment can be referred to as a second component in another embodiment.

In the following description, the technical terms are used only for explaining a specific exemplary embodiment while not limiting the present invention. The terms of a singular form may include plural forms unless referred to the contrary. The meaning of 'include' or 'comprise' specifies a property, a numeral, a step, an operation, an element or a combination thereof, but does not exclude other properties, numerals, steps, operations, elements or combinations thereof.

Figure 2:
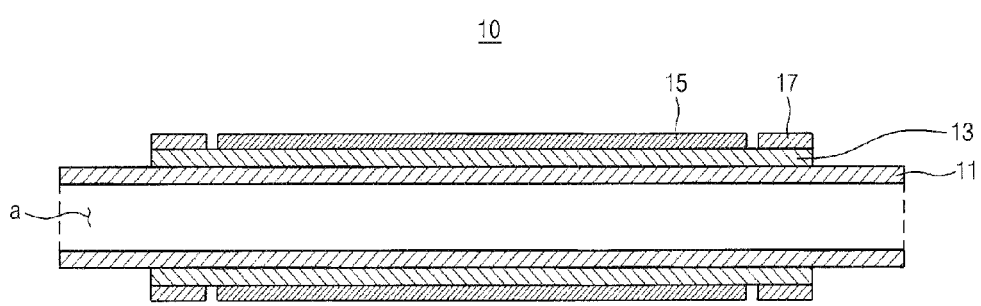
FIG. 2 is a cross-sectional view of a tubular solid oxide fuel cell of FIG. 1.
Figure 3:
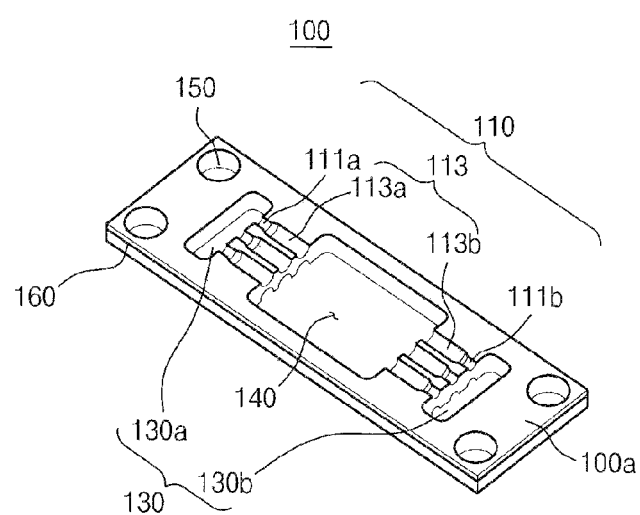
FIGS. 3 and 4 are perspective views of an intermediate connector of FIG. 1.
Figure 4:
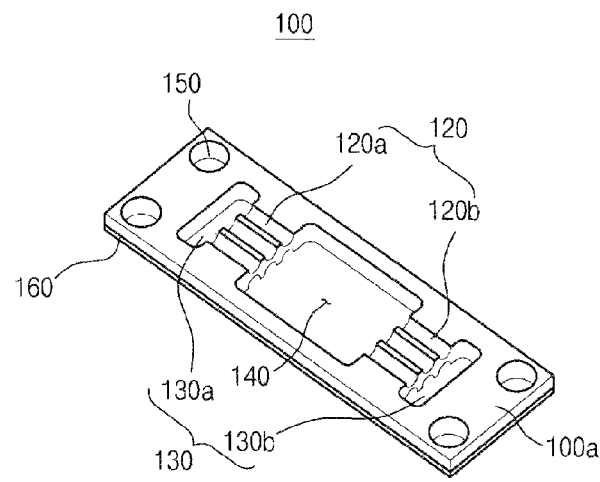
Figure 5:
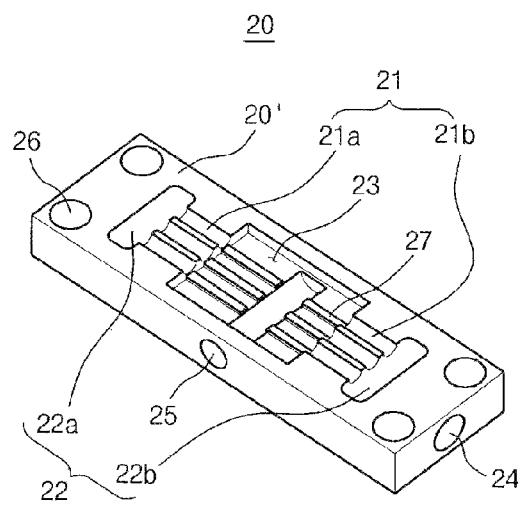
FIG. 5 is a perspective view of an upper connector of FIG. 1.
Figure 6:
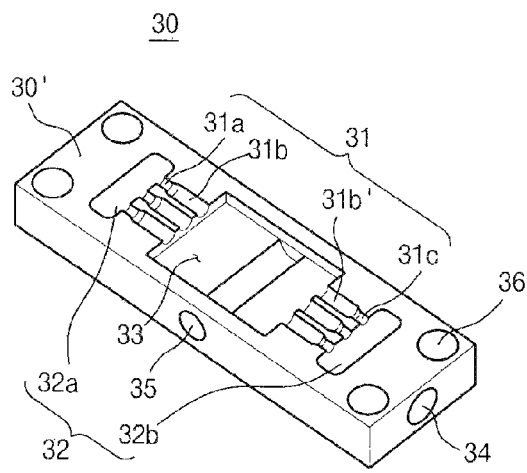
FIG. 6 is a perspective view of a lower connector of FIG. 1.

Unless terms used in the present invention are formed differently, the terms may be construed as meaning known to those skilled in the art. Terms such as terms that are generally used and have been in dictionaries should be construed as having meanings matched with contextual meanings in the art. In this description, unless formed clearly, terms are not ideally, excessively construed as formal meanings.

First Embodiment FIG. 1 is a perspective view of a solid oxide fuel cell stack according to a first embodiment of the present invention, and FIG. 2 is a cross-sectional view of a tubular solid oxide fuel cell of FIG. 1. FIGS. 3 and 4 are perspective views of an intermediate connector of FIG. 1, FIG. 5 is a perspective view of an upper connector of FIG. 1, and FIG. 6 is a perspective view of a lower connector of FIG. 1.

Referring to FIGS. 1 to 6, a solid oxide fuel cell stack 1000 according to a first embodiment of the present invention includes an upper connector 20, a lower connector 30, at least one intermediate connector 100 disposed between the upper connector 20 and the lower connector 30, at least one first tubular solid oxide fuel cell 10a disposed between the upper connector 20 and the intermediate connector 100, and at least one second tubular solid oxide fuel cell 10b disposed between the lower connector 30 and the intermediate connector 100.

Since the first and second tubular solid oxide fuel cells 10a and 10b have constitutions that are substantially equal or similar to each other, the tubular solid oxide fuel cell 10 will be described below as a representative of the first and second tubular solid oxide fuel cells 10a and 10b. In this specification, the "tubular solid oxide fuel cell" may include various types of solid oxide fuel cells, each of which has a closed loop cross-section. For example, the "tubular solid oxide fuel cell" may include a tubular solid oxide fuel cell having a circular cross-section, a solid oxide fuel cell having an oval cross-section, a flat-tubular solid oxide fuel cell, and polygonal solid oxide fuel cell having a rectangular cross-section.

The tubular solid oxide fuel cell 10 applied to the first embodiment of the present invention may include a tubular first electrode 11 having a passage therein, an electrolyte 13 stacked on the first electrode 11, and a second electrode 15 stacked on the electrolyte 13. The electrolyte 13 may be formed of an oxygen ion-conductive material. For example, the electrolyte 13 may be formed of a ceramic material such as yttria-stabilized zirconia (YSZ), $(La,Sr)(Ga,Mg)O_3$, $Ba(Zr,Y)O_3$, Gd-doped $CeO_2$ (GDC), or $Y_2O_3$ doped $CeO_2$ (YDC) which has high ion conductivity, superior stability in oxidation reduction atmosphere, and superior mechanical properties.

In an embodiment of the present invention, the tubular first electrode 11 having the passage therein may be a fuel electrode, and the second electrode 15 stacked on the electrolyte may be an air electrode. For example, the tubular solid oxide fuel cell 10 may be a fuel electrode-supported solid oxide fuel cell. In this case, a fuel gas may be supplied into the fuel electrode through the inner passage, and air containing oxygen may be supplied through a surface of the air electrode that is an outer layer. Hydrogen ($H_2$) may be uses as the fuel gas supplied into the inner passage of the fuel electrode. The hydrogen ($H_2$) supplied through the inner passage of the fuel electrode may flow up to a portion adjacent to the electrolyte 13 through the inside of the fuel electrode. The air supplied into the air electrode may generate oxygen ions through the reduction reaction of the oxygen. The oxygen ions generated in the air electrode may move toward the fuel electrode through the electrolyte 13. The oxygen ions moved into the fuel electrode and the hydrogen supplied into the fuel electrode may react with each other to generate electrical energy. The fuel electrode may have a porous structure by using a mixture of YSZ and nickel so that the hydrogen ($H_2$) flows through the inside of the fuel electrode as described above. Also, the air electrode may have a porous structure by using Lanthanum strontium manganite (LSM), Lanthanum strontium cobalt ferrite (LSCF), or the like so that the oxygen flows through the air electrode as described above. The LSM may be a compound of lanthanum (La), strontium (Sr), and manganese (Mn), and the LSCF may be a compound of lanthanum (La), strontium (Sr), cobalt (Co), and iron (Fe).

Unlike the above-described embodiment, in another embodiment of the present invention, the tubular first electrode 11 having the inner passage may be an air electrode, and the second electrode 15 stacked on the electrolyte 13 may be a fuel electrode. For example, the tubular solid oxide fuel cell 10 may be an air electrode-supported solid oxide fuel cell.

Hereinafter, for convenience of description, although the embodiment in which the tubular first electrode 11 having the inner passage is provided as the fuel electrode, and the second electrode 15 stacked on the electrolyte 13 is provided as the air electrode is described as an example, the present invention may be equally or similarly applied to an embodiment in which the tubular first electrode 11 having the inner passage is provided as the air electrode, and the second electrode 15 stacked on the electrolyte 13 is provided as the fuel electrode.

In the tubular solid oxide fuel cell 10 applied to the first embodiment of the present invention, the electrolyte 13 may be disposed on the first electrode so that both edges of the first electrode 11 are exposed by a predetermined width thereof. Also, the second electrode 15 may be disposed on the electrolyte 13 so that both edges of the electrolyte 13 are exposed by a predetermined width thereof. In an embodiment of the present invention, the tubular solid oxide fuel cell 10 may further include a sealing part 17 surrounding the exposed portions of the electrolyte 13. The sealing part 17 may be formed of a flexible glass sealing material. For example, a glass sealing material may be formed in a sheet shape and then be rolled on the tubular solid oxide fuel cell 10 to form the sealing part 17. The sealing part 17 may prevent hydrogen and/or oxygen from flowing through spaces between first and second contact grooves 110 and 120 (that will be described later) and the tubular solid oxide fuel cell 10 that is accommodated into the first and second contact grooves 110 and 120. Detailed descriptions with respect to the function of the sealing part 17 will be described below.

In the tubular solid oxide fuel cell 10 applied to the first embodiment of the present invention, to improve electrical connection performance between the first electrode 11 and the connector of the tubular solid oxide fuel cell 10, the exposed portions of the first electrode 11 may be coated with silver paste. Also, to improve electrical connection performance between the second electrode 15 and the connector of the tubular solid oxide fuel cell 10, the exposed portions of the second electrode 15 may be surrounded by a conductive wire or mesh. In the following description, "the electrical connect between a specific portion and the second electrode 15 of the tubular solid oxide material" may include a case of direct contact between "the specific portion" and "the second electrode 15 of the tubular solid oxide fuel cell 10" as well as a case of contact between "the specific portion" and "the conductive wire or mesh that is wound around the second electrode 15 of the tubular solid oxide fuel cell 10".

The tubular solid oxide fuel cell 10 applied to the present invention may further include various functional layers (not shown) between the first electrode 11 and the electrolyte 13, between the second electrode 15 and the electrolyte 13, and on the second electrode 15 or in the first electrode 11. The functional layers may be provided to improve cell efficiency as necessary.

The intermediate connector 100 electrically connects the first electrode 11 of the first tubular solid oxide fuel cell 10a disposed between the upper connector 20 and the intermediate connector 100 to the second electrode 15 of the second tubular solid oxide fuel cell 10b disposed between the lower connector 30 and the intermediate connector 100. When the first tubular solid oxide fuel cell 10a is provided in plurality, and the second tubular solid oxide fuel cell 10b is provided in plurality, the intermediate connector 100 electrically connect the first electrodes 11 of the plurality of first tubular solid oxide fuel cells 10a to each other as well as electrically connects the plurality of second electrodes 15 of the second tubular solid oxide fuel cells 10b to each other. That is, the plurality of first tubular solid oxide fuel cells 10a that are connected to each other in parallel and the plurality of second tubular solid oxide fuel cells 10b that are connected to each other in parallel are connected to each other in series. For convenience of description, although only one intermediate connector is illustrated in the drawings, a plurality of intermediate connectors 100 may be disposed between the upper connector 20 and the lower connector 30. Also, the number of intermediate connector 100 may be adequately adjusted as necessary.

To electrically connect the first and second tubular solid oxide fuel cells 10a and 10b to each other, the intermediate connector 100 includes a first body part 100a. For example, the first body part 100a may be formed on only a conductive material. On the other hand, a conductive material may be applied to a surface of an insulating base to form the first body part 100a. The first body part 100a may have top and bottom surfaces facing each other and side surfaces. For example, the first body part 100a may have a rectangular shape.

The first body part 100a includes at least one first electrode contact groove 110, at least one second electrode contact groove 120, two first through holes 130, and a second through hole 140.

The at least one first electrode contact grove 110 is formed in a top surface of the first body part 100a facing the upper connector 20. Hereinafter, as shown in the drawings, a structure in which three first electrode contact grooves 110 are formed will be described as an example. The first electrode contact grooves 110 may extend in a first direction in parallel to each other. In this case, the first electrode contact grooves 110 are arranged in a second direction perpendicular to the first direction. When the first tubular solid oxide fuel cells 10a accommodated in the first electrode contact grooves 110 have the same size and structure, the first electrode contact grooves 110 may also have the same size and structure. That is, each of the first electrode contact grooves 110 may be changed in size and structure according to the size and structure of each of the first tubular solid oxide fuel cells 10a accommodated in the first electrode contact grooves 110. For example, when the first tubular solid oxide fuel cell 10a has a circular cross-section, the first electrode contact groove 110 may have a semicircular cross-section.

Each of the first electrode contact grooves 110 may include a first end connected to a left first through hole 130a of two first through holes 130 that are spaced apart from each other and a second end connected to the right first through hole 130b. In this case, each of the first electrode contact grooves 110 may include a left-side electrode contact part 111a having a predetermined width from the first end, a right-side electrode contact part 111b having a predetermined width from the second end, and an electrode accommodation part 113 disposed between the left-side electrode contact part 111a and the right-side electrode contact part 111b. A left end of the first tubular solid oxide fuel cell 10a, i.e., a portion of the left first electrode 11 of the exposed first electrodes 11 of the first tubular solid oxide fuel cell 10a may be accommodated into the left electrode contact part 111a of the first electrode contact groove 110. In this case, the accommodated portion of the first electrode 11 is electrically connected to the left electrode contact part 111a of the first electrode contact groove 110. Also, a right end of the first tubular solid oxide fuel cell 10a, i.e., a portion of the right first electrode 11 of the exposed first electrodes 11 of the first tubular solid oxide fuel cell 10a may be accommodated into the right electrode contact part 111b of the first electrode contact groove 110. In this case, the accommodated portion of the first electrode 11 is electrically connected to the right electrode contact part 111b of the first electrode contact groove 110. In an embodiment of the present invention, a conductive oxidation protection layer (not shown) may be disposed on the electrode contact part 111 of the first electrode contact groove 110 to prevent the electrode contact part 111 of the first electrode contact groove 110 form being oxidized and to improve electrical connection performance between the electrode contact part 111 of the first electrode contact groove 110 and the first electrode 11 of the first tubular solid oxide fuel cell 10a. The conductive oxidation protection layer may be a metal-based thin film or conductive ceramic thin film which is not well oxidized. The metal-based thin film may be formed by depositing, plating, or coating a precious metal such as Ag or Pt, Ni, Ni—Co alloy, a Mn—Co alloy or by applying paste containing the metal component. The conductive ceramic thin film may be formed by coating LSM or spinel-based (Mn,Cr)3O4 or (Mn,Co)3O4 or by applying paste containing the ceramic component.

At least one portions of the portion of the first tubular solid oxide fuel cell 10a on which the sealing part 17 is disposed and the portion of the first tubular solid oxide fuel cell 10a on which the second electrode 15 is disposed are accommodated into the electrode accommodation part 113 of the first electrode contact groove 110. When the first tubular solid oxide fuel cell 10a has a circular cross-section, the first electrode contact groove 110 may have a semicircular cross-section corresponding to the circular cross-section. Since the electrolyte 13 is stacked on the first electrode 11, and the sealing part 17 and the second electrode 15 are stacked on the electrolyte 13, the portion of the first tubular solid oxide fuel cell 10a on which the sealing part 17 and the second electrode 15 are disposed may have an outer diameter greater than that of the portion of the first tubular solid oxide fuel cell 10a to which the first electrode 11 is exposed. Thus, the left/right-side electrode contact parts 111a and 111b of the first electrode contact groove 110 in which the exposed portion of the first electrode 11 of the first tubular solid oxide fuel cell 10a is accommodated may have a diameter less than that of each of the portion of the first tubular solid oxide fuel cell 10a on which the sealing part 17 is disposed and the electrode accommodation part 113 accommodating the portion of the first tubular solid oxide fuel cell 10a on which the second electrode 15 is disposed. Also, since the portion of the second electrode 15 of the first tubular solid oxide fuel cell 10a, which is accommodated in the electrode accommodation part 113 has to be electrically insulated from the first body part 100a, the electrode accommodation part 113 may have a sectional diameter greater than that of the portion of the first tubular solid oxide fuel cell 10a on which the second electrode 15 is disposed. Particularly, the electrode accommodation part 113 may be determined in sectional diameter so that the electrode accommodation part 113 of the first electrode contact groove 110 and the portion of the second electrode 15 of the first tubular solid oxide fuel cell 10a, which is accommodated in the electrode accommodation part 113 are spaced apart from each other. That is, since the electrode accommodation part 113 of the first electrode contact groove 110 and the portion of the second electrode 15 of the first tubular solid oxide fuel cell 10a, which is accommodated in the electrode accommodation part 113 are spaced apart from each other, the second electrode 15 and the first body part 100a of the first tubular solid oxide fuel cell 10a may be insulated from each other. On the other hand, to insulate the second electrode 15 and the first tubular solid oxide fuel cell 10a and the first body part 100a from each other, an insulating layer may be disposed on the electrode accommodation part 113 of the first electrode contact groove 110.

At least one second electrode contact groove 120 is formed in a bottom surface of the first body part 110a facing the lower connector 30. Hereinafter, three second electrode contact grooves 120 are exemplified as shown in the drawings. The second electrode contact grooves 120 extend in the first direction in parallel to each other. In this case, the second electrode contact grooves 120 are arranged in the second direction perpendicular to the first direction. For example, the second electrode contact grooves 120 may be formed directly below positions in which the first electrode contact grooves 110, respectively. On the other hand, the second electrode contact grooves 120 may be alternately disposed with respect to the first electrode contact grooves 110. When the second tubular solid oxide fuel cells 10b accommodated in the second electrode contact grooves 120 have the same size and structure, the second electrode contact grooves 120 may also have the same size and structure. That is, each of the second electrode contact grooves 120 may be changed in size and structure according to the size and structure of each of the second tubular solid oxide fuel cells 10b accommodated in the second electrode contact grooves 120. For example, when the second tubular solid oxide fuel cell 10b has a circular cross-section, the second electrode contact groove 120 may have a semicircular cross-section.

Each of the second electrode contact grooves 120 may include a first end connected to the left first through hole 130a of the two first through holes 130 that are spaced apart from each other and a second end connected to the right first through hole 130b. That is, the first ends of the first and second electrode contact grooves 110 and 120 may be connected to the left first through hole 130a, and the second ends may be connected to the right first through hole 130b. Unlike the first electrode contact grooves 110, each of the second electrode contact grooves 120 may have a semicircular shape with a predetermined diameter. As described above, since the electrolyte 13 is stacked on the first electrode 11, and the sealing part 17 and the second electrode 15 are stacked on the electrolyte 13, the portion of the second tubular solid oxide fuel cell 10b on which the sealing part 17 and the second electrode 15 are disposed may have an outer diameter greater than that of the portion of the first tubular solid oxide fuel cell 10a to which the first electrode 11 is exposed. Thus, when the second tubular solid oxide fuel cells 10b are respectively accommodated in the second electrode contact grooves 120, the portion on which the second electrode is disposed may be in contact with a bottom surface of the second electrode contact groove 120, but the exposed first electrode 11 may be spaced apart from the bottom surface of the second electrode contact groove 120. That is, the second electrode 15 of the second tubular solid oxide fuel cell 10b accommodated in the second electrode contact grooves 120 is electrically connected to the first body part 100a, but the first electrode 11 of the second tubular solid oxide fuel cell 10b is insulated from the first body part 100a. For this, each of the second electrode contact groove 120 may have a sectional diameter greater than or equal to that of the portion of the second tubular solid oxide fuel cell 10b on which the second electrode 15 is disposed and less than or equal to that of the electrode accommodation part 113 of each of the first electrode contact grooves 110. In an embodiment of the present invention, a conductive oxidation protection layer (not shown) may be disposed on the portion of the second electrode contact groove 120, which is in contact with the second electrode 15 of the second tubular solid oxide fuel cell 10b to prevent the portion of the second contact groove 120, which is in contact with the second electrode 15 of the second tubular solid oxide fuel cell 10b from being oxidized and to improve electrical connection performance between the second electrode contact groove 120 and the second electrode 15 of the second tubular solid oxide fuel cell 10b. The conductive oxidation protection layer may be a metal-based thin film or conductive ceramic thin film which is not well oxidized. The metal-based thin film may be formed by depositing, plating, or coating a noble metal such as Ag or Pt, Ni, Ni—Co alloy, or Mn—Co alloy or by applying paste containing the metal components. The conductive ceramic thin film may be formed by coating LSM or spinel-based (Mn,Cr)3O4 or (Mn,Co)3O4 or by applying paste containing the ceramic component. Also, to completely insulate the first body part 100a from the first electrode 11 of the second tubular solid oxide fuel cell 10b, an insulating layer (not shown) may be disposed on the portion of the second electrode contact groove 120 on which the exposed first electrode 11 of the second tubular solid oxide fuel cell 10b is disposed.

As described above, the left first through hole 130a of the two first through holes 130 may be disposed adjacent to the first ends of the first and second electrode contact grooves 110 and 120 and thus be spatially connected to all of the first ends. The right first through holes 130b of the two first through holes 130 may be disposed adjacent to the second ends of the first and second electrode contact grooves 110 and 120 and thus be spatially connected to all of the second ends. That is, when the first tubular solid oxide fuel cells 10a are accommodated in the first electrode contact grooves 110, and the second tubular solid oxide fuel cell 10b is accommodated in the second electrode contact grooves 120, a first gas may flow through the two first through holes 130 and the inner passages of the first and second tubular solid oxide fuel cells 10a and 10b. Since the sealing part 17 is disposed adjacent to both ends of each of the first and second tubular solid oxide fuel cells 10b, the two first through holes 130 are connected to each other through only the inner passages of the first and second tubular solid oxide fuel cells 10a and 10b in the tubular solid oxide fuel cell stack 1000. For example, when the tubular first electrode 11 having the inner passage of the first and second tubular solid oxide fuel cells 10a and 10b is the fuel electrode, the first gas may be hydrogen ($H_2$) that is a fuel for the solid oxide fuel cell. On the other hand, when the tubular first electrode 11 having the inner passage of the first and second tubular solid oxide fuel cells 10a and 10b is the air electrode, the first gas may be air containing oxygen.

The second through hole 140 may be disposed in the portion of each of the first and second tubular solid oxide fuel cells 100a and 10b on which the second electrode 15 is disposed to pass through the first body part 100a. The second through hole 140 may provide a passage for supplying a second gas in the second electrode 15 of the first and second tubular solid oxide fuel cells 10a and 10b. For example, when the tubular first electrode 11 having the inner passage of the first and second tubular solid oxide fuel cells 10a and 10b is the fuel electrode, and the second electrode 15 is the air electrode, the second gas may be air containing oxygen. On the other hand, when the tubular second electrode 11 having the inner passage of the first and second tubular solid oxide fuel cells 10a and 10b is the fuel electrode, the second gas may be hydrogen (H2) that is a fuel for the tubular solid oxide fuel cell 10. The second through hole 140 in a direction in which each of the first and second electrode contact grooves 110 and 120 extends may be adequately adjusted in width in consideration of supplying efficiency of the second gas with respect to the second electrode 15 and an electrical contact area between the second electrode 15 of the second tubular solid oxide fuel cell 10b and the second electrode contact groove 120. As shown in drawings, each of the first and second contact grooves 110 and 120 may be divided into two parts that are spaced apart from each other by the second through hole 140.

The first body part 100a may further include at least two first coupling holes 150. The first coupling holes 150 may pass through the first body part 100a. For example, as shown in the drawings, four first coupling holes 150 may be formed in four edges of the first body part 100a, respectively. On the other hand, the first coupling holes 150 may be formed between a left edge of the first body part 100a and the left first through hole 130a and between a right edge of the first body part 100a and the right first through hole 130b. A coupling bar (not shown) that will be described later may be inserted into each of the first coupling holes 150. When the coupling bar is inserted into the first coupling hole 150 to form the solid oxide fuel cell stack, the connectors accommodating the solid oxide fuel cell may be easily aligned. Thus, the stack may be easily assembled. Also, after the connectors are aligned, the coupling bar may be fixed by using a bolt to form the stable solid oxide fuel cell.

The upper connector 20 is electrically connected to the second electrodes 15 of the first tubular solid oxide fuel cells 10a to function as an electrode terminal for connecting the second electrodes 15 of the first tubular solid oxide fuel cells 10a to an external device. To electrically connect the second electrodes 15 of the first tubular solid oxide fuel cells 10a to the upper connector 20, the upper connector may include a conductive second body part 20'. For example, the second body part 20' may be formed of only a conductive material. On the other hand, a conductive material may be applied to the surface of the insulating base to form the second body part 20'. The second body part 20' may have a rectangular shape constituted by a bottom surface facing the intermediate connector 100, a top surface facing the bottom surface, and side surfaces connecting the top and bottom surfaces to each other.

The second body part 20' may include at least one third electrode contact groove 21 and two first gas grooves 22, and a second gas groove 23. The second body part 20' may further include at least one of a first gas injection hole 24 and a second gas injection hole 25. Also, the second body part 20' may further include a second coupling hole 26.

The third electrode contact grooves 21 are formed in the bottom surface of the second body part 20' facing the intermediate material 100. Also, the third electrode contact grooves 21 together with the first electrode contact grooves 110 of the intermediate connector 100 may accommodate the first tubular solid oxide fuel cells 10a. The third electrode contact grooves 21 may face the first electrode contact grooves 110 formed in the intermediate connector 100, respectively. That is, the third electrode contact grooves 21 may extend in the first direction in parallel to each other. In this case, the third electrode contact grooves 21 are arranged in the second direction perpendicular to the first direction. When the first tubular solid oxide fuel cells 10a accommodated in the first electrode contact grooves 110 have the same size and structure, the third electrode contact grooves 21 may also have the same size and structure. Each of the third electrode contact grooves 21 may have a semicircular cross-section.

Each of the third electrode contact grooves 21 may include a first end connected to a first gas groove 22a formed in a left side of two first gas grooves 22 and a second end connected to the first gas groove 22b formed in a right side. Each of the third electrode contact grooves 21 may be a semicircular groove with a predetermined diameter. For example, each of the third electrode contact grooves 21 may be a semicircular groove with the same diameter as the second electrode contact groove formed in the intermediate connector 100. As described above, since the electrolyte 13 is stacked on the first electrode 11, and the sealing part 17 and the second electrode 15 are stacked on the electrolyte 13, the portion of the first tubular solid oxide fuel cell 10a on which the sealing part 17 and the second electrode 15 are disposed may have an outer diameter greater than that of the portion of the first tubular solid oxide fuel cell 10a to which the first electrode 11 is exposed. Thus, when the first tubular solid oxide fuel cells 10a are respectively accommodated in the third electrode contact grooves 21, the portion on which the third electrode is disposed may be in contact with a bottom surface of the third electrode contact groove 21, and the exposed first electrode 11 may be spaced apart from the bottom surface of the third electrode contact groove 21. That is, the second electrode 15 of the first tubular solid oxide fuel cell 10a accommodated in the third electrode contact grooves 21 is electrically connected to the second body part 20', but the first electrode 11 of the first tubular solid oxide fuel cell 10a is insulated from the second body part 20'. In an embodiment of the present invention, a conductive oxidation protection layer (not shown) may be disposed on the portion of the third electrode contact hole 21, which is in contact with the second electrode 15 of the first tubular solid oxide fuel cell 10a to prevent the portion of the third contact groove 21, which is in contact with the second electrode 15 of the first tubular solid oxide fuel cell 10a from being oxidized and to improve electrical connection performance between the third electrode contact groove 21 and the second electrode 15 of the first tubular solid oxide fuel cell 10a. The conductive oxidation protection layer may be a metal-based thin film or conductive ceramic thin film which is not well oxidized. The metal-based thin film may be formed by depositing, plating, or coating a noble metal such as Ag or Pt, Ni, Ni—Co alloy, or Mn—Co alloy or by applying paste containing the metal components. The conductive ceramic thin film may be formed by coating LSM or spinel-based (Mn,Cr)3O4 or (Mn,Co)3O4 or by applying paste containing the ceramic component. Also, to completely insulate the second body part 20' from the first electrode 11 of the first tubular solid oxide fuel cell 10a, an insulating layer (not shown) may be disposed on the portion of the third electrode contact groove 21 on which the exposed first electrode 11 of the first tubular solid oxide fuel cell 10a is disposed.

The two first gas grooves 22 of the second body part 20' are formed to respectively correspond to the two first through holes 130 formed in the intermediate connector 100 to provide passages through which the first gas flows together with the first through holes 130. The left first gas groove 22a of the two first gas grooves 22 of the second body part 20' may be disposed adjacent to the first ends of the third electrode contact grooves 21 and then be connected to the first ends. Also, the right first gas groove 22b may be disposed adjacent to the second ends of the third electrode contact grooves 21 and then be connected to the second ends. The two first gas grooves 22 of the second body part 20' and the two first through holes 130 formed in the intermediate connector 100 may have the same plane area. However, unlike the first through holes 130 of the intermediate connector 100, the two first gas grooves 22 of the second body part 20' may not pass through the second body part 20'.

The second gas groove 23 of the second body part 20' is disposed to correspond to the second through hole 140 formed in the intermediate connector 100 to provide a passage through which the second gas flows together with the second through hole 140. That is, the second gas groove 23 of the second body part 20' may be disposed in the portion of the second body part 20' on which the second electrode 15 of the first tubular solid oxide fuel cell 10a is disposed. The second gas groove 23 of the second body part 20' may have the same plane area as the second through hole 140 formed in the intermediate connector 100. However, unlike the second through holes 140 of the intermediate connector 100, the second gas grooves 23 of the second body part 20' may not pass through the second body part 20'. The second gas groove in a direction in which each of the third electrode contact grooves 21 extends may be adequately adjusted in width in consideration of supplying efficiency of the second gas and an electrical contact area between the second electrode 15 of the first tubular solid oxide fuel cell 10a and the third electrode contact grooves 21. As shown in drawings, each of the third electrode contact grooves 21 may be divided into two parts that are spaced apart from each other by the second gas groove 23.

In an embodiment of the present invention, bar-shaped first contact protrusions 27 extending in the first direction to respectively electrically contact the second electrodes 15 of the first tubular solid oxide fuel cell 10a may be disposed on the bottom surface of the second gas groove 23. On the other hand, in another embodiment of the present invention, bar-shaped second contact protrusions (not shown) extending in the second direction to electrically contact all of the second electrodes 15 of the first tubular solid oxide fuel cell 10a may be disposed on the bottom surface of the second gas groove 23. As described above, when the first contact protrusions 27 and the second contact protrusions are disposed on the bottom surface of the second gas groove 23, a contact area between the upper connector 20 and the second electrodes 15 of the first tubular solid oxide fuel cell 10a may increase.

The first gas injection hole 24 may be formed in a side surface of the side surfaces of the second body part 20' facing the ends of the third electrode contact grooves 21. The first gas injection hole 24 is connected to the first gas groove 22 to provide a passage for injecting the first gas supplied into the inner passage of the tubular solid oxide fuel cell 10.

The second gas injection hole 25 may be formed in a side surface of the side surfaces of the second body part 20' disposed adjacent to the second gas groove 23. The second gas injection hole 25 is connected to the second gas groove 23 to provide a passage for injecting the second gas supplied into the second electrode 15 of the tubular solid oxide fuel cell 10.

All of the first and second gas injection holes 24 and 25 may be formed in the second body part 20'. Alternatively, only one of the first and second gas injection holes 24 and 25 may be formed in the second body part 20', and the other one may be formed in the lower connector 30 that will be described later in detail.

The second body part 20' may include second coupling holes 26 respectively connected to the first coupling holes 150 formed in the first body part 100a. The second coupling holes 26 may pass through the second body part 20' at positions corresponding to the first coupling holes 150, respectively. A coupling bar that will be described later may be inserted into each of the first and second coupling holes 150 and 26.

The lower connector 30 is electrically connected to the first electrodes 11 of the second tubular solid oxide fuel cells 10b to function as electrode terminals for connecting the first electrodes 11 of the second tubular solid oxide fuel cells 10b to an external device. To electrically connect the second electrodes 11 of the second tubular solid oxide fuel cells 10a to the lower connector 30, the lower connector may include a conductive third body part 30'. For example, the third body part 30' may be formed of only a conductive material. On the other hand, a conductive material may be applied to the surface of the insulating base to form the third body part 30'. The third body part 30' may have a rectangular shape constituted by a top surface facing the intermediate connector 100, a bottom surface facing the bottom surface, and side surfaces connecting the top and bottom surfaces to each other.

The third body part 30' may include at least one fourth electrode contact groove 31, two third gas grooves, and a fourth gas groove 33. Also, the third body part 30' may further include a third coupling hole 36. Also, when the first and second gas injection holes 24 and 25 are not formed in the second body part 20', the third body part 30' may further include third and fourth gas injection holes 34 and 35.

The fourth electrode contact grooves 31 are formed in the top surface of the third body part 30' facing the intermediate material 100. Also, the fourth electrode contact grooves 31 together with the second electrode contact grooves 120 of the intermediate connectors 100 may accommodate the second tubular solid oxide fuel cells 10b. The fourth electrode contact grooves 31 may face the second electrode contact grooves 120 formed in the intermediate connector 100, respectively. That is, the fourth electrode contact grooves 31 may extend in the first direction in parallel to each other. In this case, the fourth electrode contact grooves 31 are arranged in the second direction perpendicular to the first direction. When the second tubular solid oxide fuel cells 10b accommodated in the second electrode contact grooves 120 have the same size and structure, the fourth electrode contact grooves 31 may also have the same size and structure. Each of the fourth electrode contact grooves 31 may have a semicircular cross-section.

Each of the fourth electrode contact grooves 31 may include a first end connected to a third gas groove 32a formed in a left side of two third gas grooves 32 and a second end connected to the third gas groove 32b formed in a right side. In this case, each of the fourth electrode contact grooves 31 may include a left-side electrode contact part 31a having a predetermined width from the first end, a right-side electrode contact part 31c having a predetermined width from the second end, and an electrode accommodation part 31b disposed between the left-side electrode contact part 31a and the right-side electrode contact part 31c. A left end of the first tubular solid oxide fuel cell 10a, i.e., a portion of the left first electrode 11 of the exposed first electrodes 11 of the second tubular solid oxide fuel cell 10b may be accommodated into the left electrode contact part 31a of the fourth electrode contact grooves 31. In this case, the accommodated portion of the first electrode 11 is electrically connected to the left electrode contact part 31a of the fourth electrode contact groove 31. Also, a right end of the second tubular solid oxide fuel cell 10b, i.e., a portion of the right first electrode 11 of the exposed first electrodes 11 of the second tubular solid oxide fuel cell 10b may be accommodated into the right electrode contact part 31c of the fourth electrode contact groove 31. In this case, the accommodated portion of the first electrode 11 is electrically connected to the right electrode contact part 31c of the fourth electrode contact groove 31. In an embodiment of the present invention, a conductive oxidation protection layer (not shown) may be disposed on the electrode contact parts 31a and 31c of the fourth electrode contact groove 31 to prevent the electrode contact part 111 of the fourth electrode contact groove 31 form being oxidized and to improve electrical connection performance between the electrode contact parts 31a and 31c of the fourth electrode contact groove 31 and the first electrode 11 of the second tubular solid oxide fuel cell 10b. The conductive oxidation protection layer may be a metal-based thin film or conductive ceramic thin film which is not well oxidized. The metal-based thin film may be formed by depositing, plating, or coating a noble metal such as Ag or Pt, Ni, Ni—Co alloy, or Mn—Co alloy or by applying paste containing the metal components. The conductive ceramic thin film may be formed by coating LSM or spinel-based (Mn,Cr)3O4 or (Mn,Co)3O4 or by applying paste containing the ceramic component. At least one portions of the portion of the second tubular solid oxide fuel cell 10b on which the sealing part 17 is disposed and the portion of the second tubular solid oxide fuel cell 10b on which the second electrode 15 is disposed are accommodated into the electrode accommodation part 31 of the fourth electrode contact groove 31.

When the second tubular solid oxide fuel cell 10b has a circular cross-section, the fourth electrode contact groove 31 may have a semicircular cross-section corresponding to the circular cross-section. Since the electrolyte 13 is stacked on the first electrode 11, and the sealing part 17 and the second electrode 15 are stacked on the electrolyte 13, the portion of the second tubular solid oxide fuel cell 10b on which the sealing part 17 and the second electrode 15 are disposed may have an outer diameter greater than that of the portion of the second tubular solid oxide fuel cell 10b to which the second electrode 11 is exposed. Thus, the left/right-side electrode contact parts 31a and 31c of the fourth electrode contact groove 31 in which the exposed portion of the first electrode 11 of the second tubular solid oxide fuel cell 10b is accommodated may have a diameter less than that of each of the portion of the second tubular solid oxide fuel cell 10b on which the sealing part 17 is disposed and the electrode accommodation part 31b accommodating the portion of the second tubular solid oxide fuel cell 10b on which the second electrode 15 is disposed. Also, since the portion of the second electrode 15 of the second tubular solid oxide fuel cell 10b, which is accommodated in the electrode accommodation part 31b has to be electrically insulated from the first body part 30', the electrode accommodation part 31b may have a sectional diameter greater than that of the portion of the second tubular solid oxide fuel cell 10b on which the second electrode 15 is disposed. Particularly, the electrode accommodation part 31b may be determined in sectional diameter so that the electrode accommodation part 31b of the fourth electrode contact groove 31 and the portion of the second electrode 15 of the second tubular solid oxide fuel cell 10b, which is accommodated in the electrode accommodation part 31b are spaced apart from each other. That is, since the electrode accommodation part 31b of the fourth electrode contact groove 31 and the portion of the second electrode 15 of the second tubular solid oxide fuel cell 10b, which is accommodated in the electrode accommodation part 31b are spaced apart from each other, the second electrode 15 and the third body part 30' of the second tubular solid oxide fuel cell 10b may be insulated from each other. Also, to insulate the second electrode 15 of the second tubular solid oxide fuel cell 10b and the third body part 30' from each other, an insulating layer (not shown) may be disposed on the electrode accommodate part of the fourth electrode contact groove 31.

The two third gas grooves 32 are formed to respectively correspond to the two first through holes 130 formed in the intermediate connector 100 to provide passages through which the first gas flows together with the first through holes 130 of the intermediate material 100 and the first gas groove 22 of the upper connector 20. That is, the left third gas groove 32a of the two third gas grooves 32 of the third body part 30' may be disposed adjacent to the first ends of the fourth electrode contact grooves 31 and then be connected to the first ends. Also, the right first gas groove 32b may be disposed adjacent to the second ends of the fourth electrode contact grooves 31 and then be connected to the second ends. The two third gas grooves 32 and the two first through holes 130 may have the same plane area. However, unlike the first through holes 130 of the intermediate connector 100, the third gas grooves 23 may not pass through the third body part 30'.

The fourth gas groove 33 is formed to correspond to the second through hole 140 to provide a passage through which the second gas flows together with the second through hole 140 and the second gas groove 23. That is, the fourth gas groove 33 may be disposed in the portion of the third body part 30' on which the second electrode 15 of the second tubular solid oxide fuel cell 10b is disposed. The fourth through holes 33 may have the same plane area as the second through hole 140. However, unlike the second through holes 140 of the intermediate connector 100, the fourth gas grooves 33 may not pass through the third body part 30'. As shown in drawings, each of the fourth electrode contact grooves 31 may be divided into two parts that are spaced apart from each other by the fourth gas groove 33.

The third gas injection hole 34 may be formed in a side surface of the side surfaces of the third body part 30' facing the ends of the fourth electrode contact grooves 31. The third gas injection hole 34 is connected to the third gas groove 32 to provide a passage for injecting the first gas supplied into the inner passage of the tubular solid oxide fuel cell 10.

The fourth gas injection hole 35 may be formed in a side surface of the side surfaces of the third body part 30' disposed adjacent to the fourth gas groove 33. The fourth gas injection hole 35 is connected to the fourth gas groove 33 to provide a passage for injecting the second gas supplied into the second electrode 15 of the tubular solid oxide fuel cell 10.

All of the third and fourth gas injection holes 32 and 35 may be formed in the second body part 30'. Alternatively, only one of the third and fourth gas injection holes 32 and 35 may be formed in the fourth body part 30'. For example, when only the first gas injection hole 24 is formed in the second body part 20', the fourth gas injection hole 35 may be formed in the third body part 30'.

The third body part 30' may include third coupling holes 36 respectively connected to the first coupling holes 150 formed in the first body part 100*a*. That is, the third coupling holes 36 may pass through the third body part 30' at positions corresponding to the first coupling holes 150, respectively.

In the first embodiment of the present invention, the solid oxide fuel cell 1000 may further include an insulating sealing member 160 disposed between the connectors adjacent to each other. When the two connectors adjacent to each other are electrically connected to each other, the first and second electrodes 11 and 15 of the tubular solid oxide fuel cell 10, which are disposed between the adjacent connectors may be short-circuited. Thus, the connectors have to be insulated from each other. Also, the connectors may be sealed therebetween to prevent the first and second gases injected into the tubular solid oxide fuel cell stack 1000 from leaking to the outside. The insulating sealing member 160 may electrically insulate the adjacent connectors as well as prevent the first or second gas from leaking to the outside of the solid oxide fuel cell stack 1000 through a gap between the adjacent connectors. The insulating sealing member 160 may be coated on an edge of a top surface of the lower connector of the adjacent connectors or an edge of a bottom surface of the upper connector. Alternatively, the insulating sealing member 160 may be a separate member disposed between the edge of the upper connector of the adjacent connectors and the lower connector. For example, the insulating sealing member 160 may include a first insulating sealing member (not shown) disposed between the upper connector 20 and the intermediate connector 100, a second insulating sealing member (not shown) disposed between the intermediate connector 100 and the lower connector 30, and a third insulating sealing member (not shown) disposed between intermediate connectors 100 when at least two intermediate connectors 100 are provided.

Also, the solid oxide fuel cell stack 100 according to the first embodiment of the present invention may further include a coupling bar (not shown) inserted into the first to third coupling holes 36. The coupling bar may include a ceramic tube (not shown). When a nut (not shown) is coupled after a bolt (not shown) is inserted into the ceramic tube that is used as the coupling bar, the stacked connectors 20, 100, and 30 and the tubular solid oxide fuel cells 10 disposed among the connectors 20, 100, and 30 may be stably fixed to improve electrical contact reliability between the electrode contact grooves and the electrodes 11 and 15 of the tubular solid oxide fuel cell 10.

Second Embodiment

Figure 7:
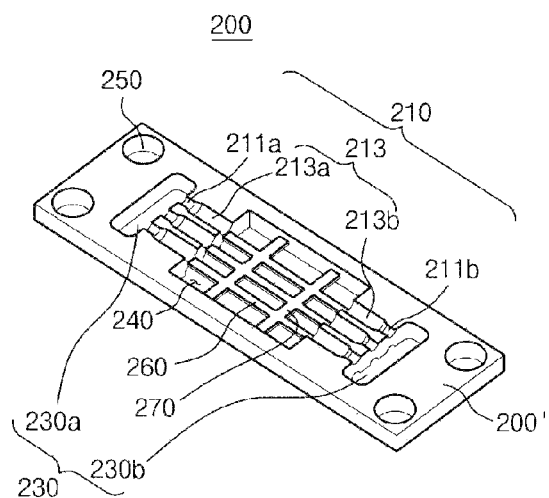
FIGS. 7 and 8 are perspective views of an intermediate connector that is applied to a solid oxide fuel cell stack according to a second embodiment of the present invention.
Figure 8:
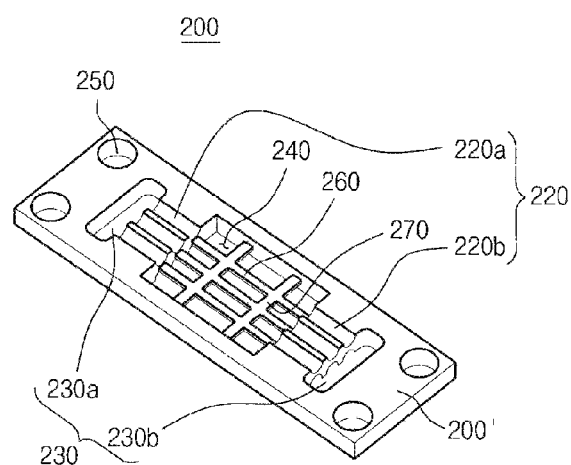

FIGS. 7 and 8 are perspective views of an intermediate connector that is applied to a solid oxide fuel cell stack according to a second embodiment of the present invention.

Referring to FIGS. 1, 2, 7, and 8, a solid oxide fuel cell stack 1000 according to a second embodiment of the present invention includes an upper connector 20, a lower connector 30, an intermediate connector 200, at least one first tubular solid oxide fuel cell 10*a* disposed between the upper connector 20 and the intermediate connector 200, at least one second tubular solid oxide fuel cell 10*b* disposed between the lower connector 30 and the intermediate connector 200, an insulating sealing member (not shown), and a coupling bar (not shown). In the solid oxide fuel cell stack 1000 according to the second embodiment, since the solid oxide fuel cell stack 1000 has substantially the same constitution as the solid oxide fuel cell stack 1000 according to the first embodiment except for an intermediate connector 200, the intermediate connector 200 will be mainly described below, and thus, descriptions with respect to other constitutions will be omitted.

The intermediate connector 200 includes a conductive body part 200'. The conductive body part 200' includes first electrode contact grooves 210, second electrode contact grooves 220, first through holes 230, second through holes 240, first electrode contact bars 260, second electrode contact bars 270, and first coupling holes 250. Since the other parts except for the first and second electrode contact bars 260 and 270 have substantially equal or similar to those described in the first embodiment, their detailed description will be omitted.

The first electrode contact bars 260 are disposed to cross the second through holes 250 in a first direction to which each of the first and second electrode contact grooves 210 and 220 extends. The first electrode contact bars 260 electrically contact the second electrodes 17 of the tubular solid oxide fuel cells 10 accommodated in the second electrode contact grooves 220, respectively. The first electrode contact bars 260 adjacent to each other may be spaced a predetermined distance from each other.

The second electrode contact bars 270 are disposed to cross the second through holes 240 in a second direction perpendicular to the first direction. Each of the second electrode contact bars 270 may cross all of the first electrode contact bars 260. The second electrode contact bars 270 electrically contact all of the second electrodes 17 of the tubular solid oxide fuel cells 10 accommodated in the second electrode contact grooves 220. The second electrode contact bars 270 adjacent to each other may be spaced a predetermined distance from each other.

Although the first and second electrode contact bars 260 and 270 are provided in the current embodiment, only one of the first and second electrode contact bars 260 and 270 may be provided.

As described above, when the first electrode contact bars 260 and/or the second electrode contact bars 270 are provided, an electrical contact area between the second electrodes 17 of the tubular solid oxide fuel cell 10 accommodated in the second electrode contact grooves 220 and the body part 200' may increase.

Third Embodiment

Figure 9:
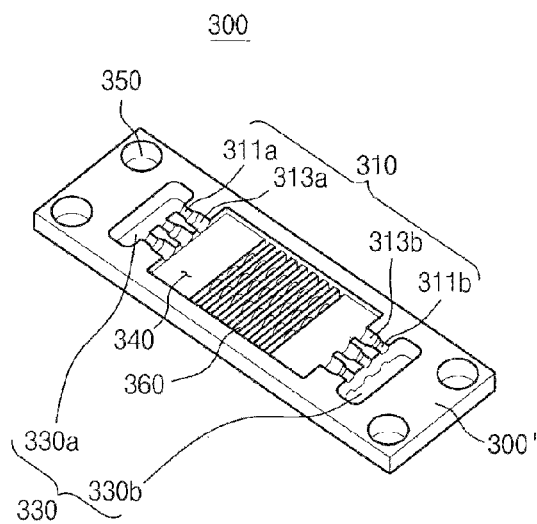
FIGS. 9 and 10 are perspective views of an intermediate connector that is applied to a solid oxide fuel cell stack according to a third embodiment of the present invention.
Figure 10:
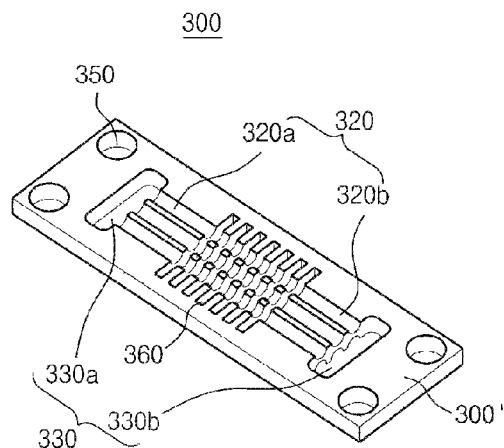

FIGS. 9 and 10 are perspective views of an intermediate connector that is applied to a solid oxide fuel cell stack according to a third embodiment of the present invention.

Referring to FIGS. 1, 2, 9, and 10, a solid oxide fuel cell stack 1000 according to a second embodiment of the present invention includes an upper connector 20, a lower connector 30, an intermediate connector 300, at least one first tubular solid oxide fuel cell 10*a* disposed between the upper connector 20 and the intermediate connector 300, at least one second tubular solid oxide fuel cell 10*b* disposed between the lower connector 30 and the intermediate connector 300, an insulating sealing member (not shown), and a coupling bar (not shown). In the solid oxide fuel cell stack 1000 according to the third embodiment, since the solid oxide fuel cell stack 1000 has substantially the same constitution as the solid oxide fuel cell stack 1000 according to the first embodiment except for an intermediate connector 300, the intermediate connector 300 will be mainly described below, and thus, descriptions with respect to other constitutions will be omitted.

The intermediate connector 300 includes a conductive body part 300'. The conductive body part 300' includes first electrode contact grooves 310, second electrode contact grooves 320, first through holes 330, a second gas groove 340, second through slits 360, and first coupling holes 350. Since the other parts except for the second electrode contact grooves 320, the second gas groove 340, and the second through slits 360 have substantially equal or similar to those described in the first embodiment, their detailed description will be omitted.

A second gas groove 340 that divides the first electrode contact grooves 310 into two parts spaced apart from each other is formed in a top surface of the body part having the first electrode contact grooves 310. The second gas groove 340 does not pass through the body part 300'. A plurality of through slits 360 extending in a second direction perpendicular to a first direction to which each of the first and second electrode contact grooves 310 and 320 extends are formed in the second gas grooves 340. The plurality of through slits 360 provide spaces through which a second gas flows. The second electrode contact grooves 320 are formed in a bottom surface of the body part 300', and the second electrode contact grooves 320 meet the second through slits 360. Each of the second electrode contact grooves 320 continuously extends from an end of one side to an end of the other side of each of the second electrode contact grooves 320 except for the region in which the second through slits 360 are formed.

As described above, when the second electrode contact grooves 320 extends extend in a region remaining except for the region in which the second through slits 360 are formed, an electrical contact area between the second electrodes 17 of the tubular solid oxide fuel cell 10 accommodated in the second electrode contact grooves 320 and the body part 300'.

Fourth Embodiment

Figure 11:
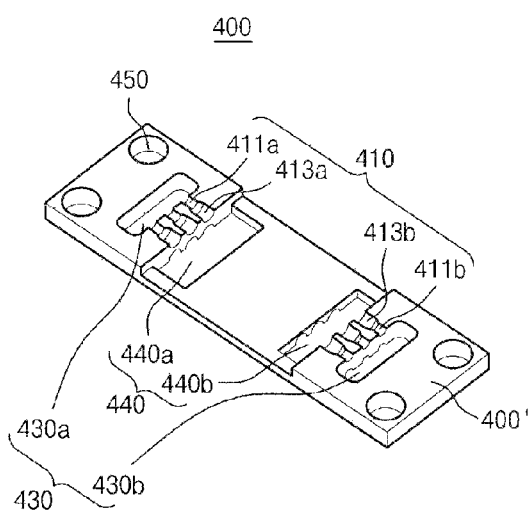
FIGS. 11 and 12 are perspective views of an intermediate connector that is applied to a solid oxide fuel cell stack according to a fourth embodiment of the present invention.
Figure 12:
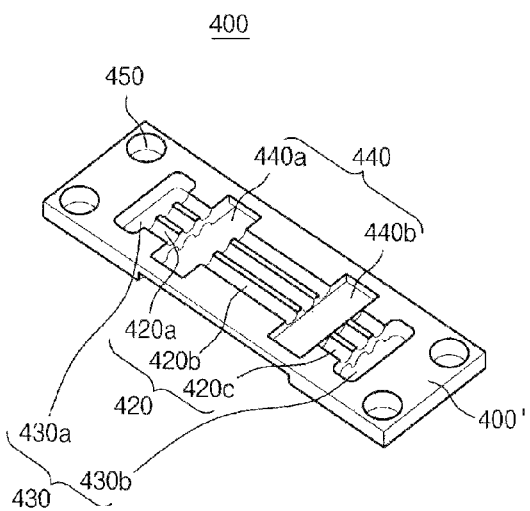

FIGS. 11 and 12 are perspective views of an intermediate connector that is applied to a solid oxide fuel cell stack according to a fourth embodiment of the present invention.

Referring to FIGS. 1, 2, 11, and 12, a solid oxide fuel cell stack 1000 according to a fourth embodiment of the present invention includes an upper connector 20, a lower connector 30, an intermediate connector 400, at least one first tubular solid oxide fuel cell 10a disposed between the upper connector 20 and the intermediate connector 400, at least one second tubular solid oxide fuel cell 10b disposed between the lower connector 30 and the intermediate connector 400, an insulating sealing member (not shown), and a coupling bar (not shown). In the solid oxide fuel cell stack 1000 according to the third embodiment, since the solid oxide fuel cell stack 1000 has substantially the same constitution as the solid oxide fuel cell stack 1000 according to the first embodiment except for an intermediate connector 400, the intermediate connector 400 will be mainly described below, and thus, descriptions with respect to other constitutions will be omitted.

The intermediate connector 400 includes a conductive body part 400'. The conductive body part 400' includes first electrode contact grooves 410, second electrode contact grooves 420, first through holes 430, second gas grooves 440, and first coupling holes 450. Since the other parts except for the second electrode contact grooves 420 and the second through holes 440 have substantially equal or similar to those described in the first embodiment, their detailed description will be omitted.

Two second through holes 440 that are spaced apart from each other between the first through holes 430 are formed in the body part 400'. Each of the first electrode contact grooves 410 formed in a top surface of the body part 400' are formed in a region between first and second through holes 430a and 440a which are formed in a left side and a region between first and second through holes 430b and 440b which are formed in a right side and are not formed in the region in which the second through holes 440 are formed and in a region between the second through holes 440. Thus, each of the first electrode contact grooves 410 are divided into two parts that are spaced apart from each other.

Each of the second electrode contact grooves 420 formed in a bottom surface of the body part 400' are formed in the region between first and second through holes 430a and 440a which are formed in the left side and the region between first and second through holes 430b and 440b which are formed in the right side as well as in the region between the second through holes 440. Thus, each of the second electrode contact grooves 420 are divided into three parts that are spaced apart from each other.

As described above, since the second electrode contact grooves 420 are formed in the region between the second through holes 440, a contact area between the body part 400' and the second electrode 17 of the tubular solid oxide fuel cell 10 accommodated in the second electrode contact parts 420 may increase.

Fifth Embodiment

Figure 13:
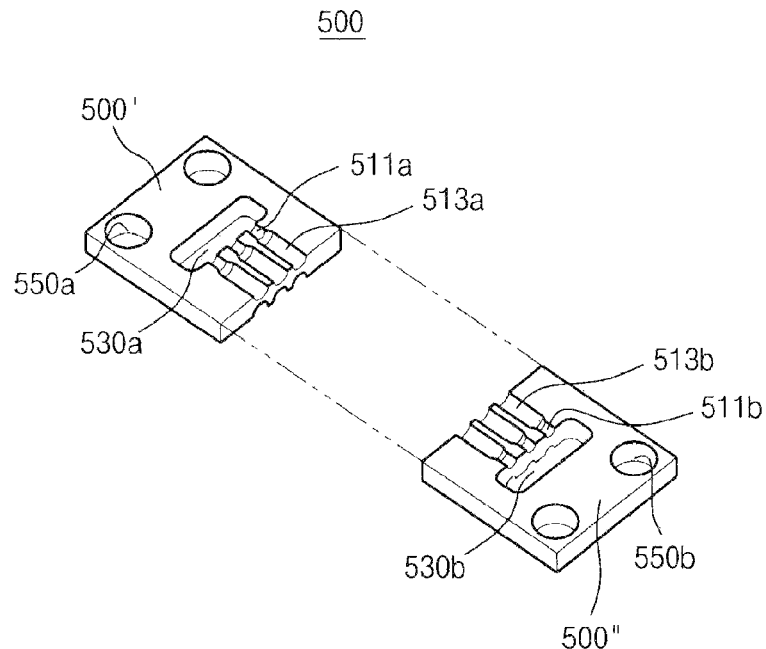
FIGS. 13 and 14 are perspective views of an intermediate connector that is applied to a solid oxide fuel cell stack according to a fifth embodiment of the present invention.
Figure 14:
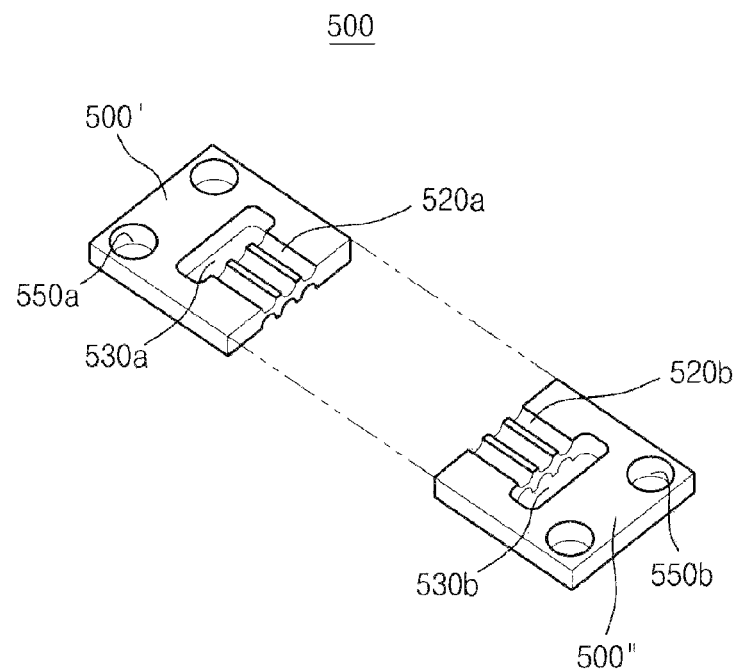

FIGS. 13 and 14 are perspective views of an intermediate connector that is applied to a solid oxide fuel cell stack according to a fifth embodiment of the present invention.

Referring to FIGS. 1, 2, 13, and 14, a solid oxide fuel cell stack 1000 according to a second embodiment of the present invention includes an upper connector 20, a lower connector 30, an intermediate connector 500, at least one first tubular solid oxide fuel cell 10a disposed between the upper connector 20 and the intermediate connector 500, at least one second tubular solid oxide fuel cell 10b disposed between the lower connector 30 and the intermediate connector 500, an insulating sealing member (not shown), and a coupling bar (not shown). In the solid oxide fuel cell stack 1000 according to a fifth embodiment, since the solid oxide fuel cell stack 1000 has substantially the same constitution as the solid oxide fuel cell stack 1000 according to the first embodiment except for an intermediate connector 500, the intermediate connector 500 will be mainly described below, and thus, descriptions with respect to other constitutions will be omitted.

The intermediate connector 500 includes conductive body parts 500' and 500". The conductive body parts 500' and 500" include first and second body parts 500' and 500" that are separated from each other. The first body part 500' may have substantially the same constitution as the portion of the intermediate connector, which is disposed on a left side of the second through hole according to the first embodiment, and the second body part 500" may have substantially the same constitution as the portion of the intermediate connector, which is disposed on a right side of the second through hole according to the first embodiment. Thus, detailed descriptions with respect to the first and second body parts 500' and 500" will be denoted by those described in the first embodiment.

INDUSTRIAL APPLICABILITY

As described above, according to the embodiments of the present invention, the tubular solid oxide fuel cell may be accommodated in the electrode contact groove formed in the connector to manufacture the stable solid oxide fuel cell stack. Also, since the passages through which hydrogen ($H_2$) and air flow are formed in the connector, the solid oxide fuel cell stack that is easily sealed may be manufactured. Also, when the solid oxide fuel cell stack is manufactured by using the connectors according to the embodiments of the present invention, an additional constitution for collecting electricity may be unnecessary, and the stack assembling process may be simplified.

Although the exemplary embodiments have been described with reference to the specific embodiments, they are not limited thereto. Therefore, it will be readily understood by those skilled in the art that various modifications and changes can be made thereto without departing from the spirit and scope of the present disclosure formed by the appended claims.

The invention claimed is:

1. A connector for a solid oxide fuel cell, the connector comprising a conductive body part for electrically connecting solid oxide fuel cells to each other, each of the solid oxide fuel cells including a first electrode having an inner passage and an electrolyte and second electrode successively stacked on the first electrode to expose both ends of the first electrode, characterized in that the conductive body part having top and bottom surfaces opposite to each other and side surfaces connecting the top and bottom surface, comprises:
a first electrode contact groove formed in the top surface in which the exposed end portions of the first electrode and at least a portion of the second electrode of a first solid oxide fuel cell of the solid oxide fuel cells are accommodated, the first electrode contact groove being electrically connected to the first electrode of the first solid oxide fuel cell; and
a second electrode contact groove formed in the bottom surface in which the exposed end portions of the first electrode and at least a portion of the second electrode of a second solid oxide fuel cell of the solid oxide fuel cells are accommodated, the second electrode contact groove being electrically connected to the second electrode of the second solid oxide fuel cell,
wherein the body part further comprises:
a first through hole penetrating through the body part, the first through hole being connected to a first end of the first electrode contact groove and a first end of the second electrode contact groove, which are adjacent to each other; and
a second through hole penetrating through the body part, the second through hole being connected to a second end of the first electrode contact groove and a second end of the second electrode contact groove which are adjacent to each other.

2. The connector of claim 1, wherein the first electrode contact groove comprises an electrode contact part accommodating the exposed first electrode of the first electrode of the first solid oxide fuel cell and being electrically connected to the first electrode of the first solid oxide fuel cell; and an electrode accommodation part accommodating the second electrode of the first solid oxide fuel cell and being electrically insulated from the second electrode of the first solid oxide fuel cell, and
the electrode contact part has a width and a depth less than those of the electrode accommodation part to form a stepped portion between the electrode contact part and the electrode accommodation part.

3. The connector of claim 2, wherein an insulating layer is disposed on the electrode accommodation part.

4. The connector of claim 2, wherein the second electrode contact groove has a width and a depth that are equal to or less than those of the electrode accommodation part.

5. The connector of claim 1, wherein the body part further comprises a third through hole penetrating through the body part in a portion at which at least one portion of the second electrodes of the first and second solid oxide fuel cells is disposed.

6. The connector of claim 5, wherein the body part further comprises an electrode contact bar connecting both facing ends of the third through hole to each other and electrically connected to the second electrode of the second tubular solid oxide fuel cell.

7. The connector of claim 1, wherein the body part further comprises:
a first coupling hole formed between the first through hole and a first end of the body part adjacent to the first through hole; and
a second coupling hole formed between the second through hole and a second end of the body part, which is adjacent to the second through hole and faces the first end.

8. A solid oxide fuel cell stack comprising:
first and second solid oxide fuel cells, each including a first electrode having an inner passage and an electrolyte and second electrode successively stacked on the first electrode to expose both ends of the first electrode;
an intermediate connector including a first body part having top and bottom surfaces opposite to each other and side surfaces connecting the top and bottom surfaces, the intermediate connector further including a first electrode contact groove formed in the top surface to accommodate the first solid oxide fuel cell and a second electrode contact groove formed in the bottom surface to accommodate the second solid oxide fuel cell;
an upper connector comprising a second body part having a third electrode contact groove accommodating the first solid oxide fuel cell together with the first electrode contact groove and electrically connected to the second electrode of the first solid oxide fuel cell; and
a lower connector comprising a third body part having a fourth electrode contact groove accommodating the second solid oxide fuel cell together with the second electrode contact groove and electrically connected to the first electrode of the second solid oxide fuel cell,
wherein the first electrode contact groove accommodates the exposed end portions of the first electrode and at least a portion of the second electrode of the first solid oxide fuel cell and is electrically connected to the first electrode of the first solid oxide fuel cell, and the second electrode contact groove accommodates the exposed end portions of the first electrode and at least a portion of the second electrode of the second solid oxide fuel cell and is electrically connected to the second electrode of the second solid oxide fuel cell.

9. The solid oxide fuel cell stack of claim 8, wherein the first body part comprises a first through hole connected to an inner passage of each of the first and second solid oxide fuel cells,
the second body part comprises a first gas groove connected to the first through hole, and
the third body part comprises a second gas groove connected to the first through hole and a first gas injection hole for injecting a first gas into the second gas groove.

10. The solid oxide fuel cell stack of claim 9, wherein the first body part comprises a second through hole formed in a position at which the second electrode of each of the first and second solid oxide fuel cells is disposed,
- the second body part comprises a third gas groove connected to the second through hole, and
- the third body part comprises a fourth gas groove connected to the second through hole and a second gas injection hole for injecting a second gas into the fourth gas groove.

11. The solid oxide fuel cell stack of claim 8, further comprising:
- a first insulating member disposed between the intermediate connector and the upper connector to insulate the intermediate connector from the upper connector; and
- a second insulating member disposed between the intermediate connector and the lower connector to insulate the intermediate connector from the lower connector.

* * * * *